US011234120B2

(12) United States Patent
Bergström et al.

(10) Patent No.: US 11,234,120 B2
(45) Date of Patent: Jan. 25, 2022

(54) SYSTEMS AND METHODS FOR TRIGGERING CONNECTION STATUS REPORTING FOR A WIRELESS LOCAL AREA NETWORK

(71) Applicant: TELEFONAKTIEBOLAGET LM ERICSSON (PUBL), Stockholm (SE)

(72) Inventors: Mattias Bergström, Stockholm (SE); Helka-Liina Määttanen, Helsinki (FI); Torsten Dudda, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 154 days.

(21) Appl. No.: 16/075,421

(22) PCT Filed: Feb. 6, 2017

(86) PCT No.: PCT/IB2017/050638
§ 371 (c)(1),
(2) Date: Aug. 3, 2018

(87) PCT Pub. No.: WO2017/134641
PCT Pub. Date: Aug. 10, 2017

(65) Prior Publication Data
US 2019/0053041 A1    Feb. 14, 2019

Related U.S. Application Data

(60) Provisional application No. 62/291,778, filed on Feb. 5, 2016.

(51) Int. Cl.
*H04W 8/22*    (2009.01)
*H04W 24/10*    (2009.01)
(Continued)

(52) U.S. Cl.
CPC .......... *H04W 8/22* (2013.01); *H04L 43/0811* (2013.01); *H04W 8/02* (2013.01); *H04W 24/10* (2013.01);
(Continued)

(58) Field of Classification Search
CPC ....... H04W 8/22; H04W 76/18; H04W 76/11; H04W 8/02; H04W 24/10; H04W 48/18;
(Continued)

(56) References Cited

U.S. PATENT DOCUMENTS

2017/0171777 A1\* 6/2017 Laselva ................. H04W 24/10
2018/0146390 A1\* 5/2018 Kim ....................... H04W 36/22
2018/0376530 A1\* 12/2018 Fujishiro ............... H04W 88/06

OTHER PUBLICATIONS

R2-157095, 3GPP TSG-RAN WG2 Meeting #92, Nov. 2015 (Year: 2015).\*
(Continued)

*Primary Examiner* — Sharmin Chowdhury
(74) *Attorney, Agent, or Firm* — Sage Patent Group

(57) ABSTRACT

According to certain embodiments, a method by a wireless device for reporting a connection status is provide that includes receiving a message from a network node. The message may be related to a mobility set associated with the wireless device. The wireless device may determine that the wireless device is not connected to a WLAN access point included within a mobility set. A timer may be started, and the wireless device may attempt to establish a connection between the wireless device and at least one WLAN access point within the mobility set before an expiration of the timer. If the connection is established between the wireless device and the at least one WLAN access point within the mobility set before the expiration of the timer, the timer may be stopped. If the connection is not established between the wireless device and the at least one WLAN access point
(Continued)

within the mobility set before the expiration of the timer, a report may be sent to a network node to indicate a connection failure.

32 Claims, 6 Drawing Sheets

(51) Int. Cl.
*H04W 76/18* (2018.01)
*H04W 76/11* (2018.01)
*H04L 12/26* (2006.01)
*H04W 8/02* (2009.01)
*H04W 48/18* (2009.01)
*H04W 88/06* (2009.01)
*H04W 84/02* (2009.01)
*H04W 84/12* (2009.01)

(52) U.S. Cl.
CPC ............ *H04W 76/11* (2018.02); *H04W 76/18* (2018.02); *H04W 48/18* (2013.01); *H04W 84/02* (2013.01); *H04W 84/12* (2013.01); *H04W 88/06* (2013.01)

(58) Field of Classification Search
CPC ..... H04W 88/06; H04W 84/02; H04W 84/12; H04L 43/0811
See application file for complete search history.

(56) References Cited

OTHER PUBLICATIONS

R2-157095, 3GPP TSG-RAN WG2 Meeting #92, 76 pages (Year: 2015).*
Ericsson, Mobility procedures for LTE-WLAN aggregation, Tdoc R2-153689, 3GPP TSG-RAN WG2 #91, Beijing, China, Aug. 24-28, 2015.
Samsung, Mobility handling for LTE-WLAN aggregation, R2-153078, 3GPP TSG-RAN WG2 Meeting #91, Beijing, China, Aug. 24-28, 2015.
Ericsson, Connection failure report, Tdoc R2-153645, 3GPP TSG-RAN WG2 #91, Beijing, China, Aug. 24-28, 2015.

* cited by examiner

SYSTEMS AND METHODS FOR TRIGGERING CONNECTION STATUS REPORTING FOR A WIRELESS LOCAL AREA NETWORK

PRIORITY

This application is a 371 of International Application No. PCT/162017/050638, filed Feb. 6, 2017, which claims priority to U.S. Patent Provisional Application No. 62/291,778 filed on Feb. 5, 2016, entitled "Connection Status Report Triggering for WLAN," the disclosures of which are hereby incorporated by reference.

TECHNICAL FIELD

The present disclosure relates, in general, to wireless communications and, more particularly, to systems and methods for triggering a connection status reporting for a wireless local area network (WLAN).

BACKGROUND

LTE-WLAN aggregation (LWA) is a feature wherein the UE may receive and transmit using links to both eNodeB (eNB) and WLAN. This feature is standardized by 3GPP in Release 13 as part of RP-150510, revised in RP-151114.

There are different architecture options for LTE-WLAN aggregation. In the split bearer architecture option, in the standard denoted also by option 3C, data is split in the Packet Data Convergence Protocol (PDCP) layer. For the downlink direction, this split is done in the eNB. For example, the eNB may dynamically decide how to route PDCP packet data units (PDUs) to the UE. Specifically, PDUs may be routed directly to the UE using LTE Radio Link Control (RLC), LTE Medium Access Control (MAC), and LTE Physical layer (PHY). Alternatively, PDUs may be routed via a backhaul channel to WLAN and then to the UE using 802.11 MAC and 802.11 PHY.

FIG. 1 illustrates an example protocol architecture for LTE-WLAN aggregation. The WLAN termination (WT) point in the network may be implemented by an WLAN access point (AP) and/or access controller (AC) or a further network node. The interface protocol between the eNB and WT is denoted Xw. FIG. 1 depicts just one example architecture for LTE-WLAN aggregation. Other architecture options for LTE-WLAN aggregation are not precluded.

The WLAN mobility set is a set of one or more WLAN APs identified by one or more basic service set identifiers (BSSID), homogeneous service set identifiers (HESSID), or extended service set identifiers (SSIDs), within which WLAN mobility mechanisms apply while the UE is configured with LWA. When a UE is configured with a WLAN mobility set, the UE may perform mobility between WLAN APs belonging to the mobility set without informing the eNB. Thus, the eNB provides the UE with the (i.e. at most one) WLAN mobility set. When the mobility set is configured the first time, the UE is issued to attempt connect to a WLAN in the mobility set. UE mobility to WLAN APs not belonging to the UE mobility set is controlled by the eNB by updating the mobility set.

UEs may provide connection status reports when configured with LWA. Generally, when the LWA feature is used, it may be important for the eNB to know whether the UE fails to connect or succeeds to connect to WLAN. Accordingly, a UE may monitor the connection status for WLAN and if the connection status fails, the UE may send a message, which may be known as WLANConnectionStatusReport, to the eNB. Connection status may be considered a failure when the UE does not manage to establish a connection to a WLAN or when a connection which was already established is broken. On the other hand, if the eNB indicates to the UE to establish a connection to a WLAN and the UE manages to do so, then the UE would indicate that it successfully connected to WLAN.

The WLAN reporting feature may use a timer, which is started when the UE receives a message with a timer value. The timer may be referred to as T351 and may be started when the UE receives a message with the timer value. If the UE attempts to connect to a WLAN but does not successfully connect to a WLAN before the timer expires, then the UE may consider that the WLAN connection attempt has failed. UE may then indicate the failure to the eNB by sending the "WLANConnectionStatusReport" message.

However, the WLAN reporting feature is not without problems. Specifically, with the existing connection status report feature, the UE may not send WLAN connection status reports in all situations where such reporting would be beneficial. As a result, the eNB may lack important information and may not configure the UE in a proper way. Thus, both end user and system performance may suffer. Conversely, the UE may send a report even when such a report is not needed and unnecessarily increase signaling overhead.

SUMMARY

To address the foregoing problems with existing solutions, disclosed is methods and systems for configuring a wireless device to report a connection status to a WLAN access point.

According to certain embodiments, a method by a wireless device for reporting a connection status is provided that includes receiving a message from a network node. The message may be related to a mobility set associated with the wireless device. The wireless device may determine that the wireless device is not connected to a WLAN access point included within a mobility set. A timer may be started, and the wireless device may attempt to establish a connection between the wireless device and at least one WLAN access point within the mobility set before an expiration of the timer. If the connection is established between the wireless device and the at least one WLAN access point within the mobility set before the expiration of the timer, the timer may be stopped. If the connection is not established between the wireless device and the at least one WLAN access point within the mobility set before the expiration of the timer, a report may be sent to a network node to indicate a connection failure.

According to certain embodiments, a wireless device for reporting a connection status is provided. The wireless device comprises an interface, a processor, and storage. The wireless device is configured to receive a message from a network node. The message is related to a mobility set associated with the wireless device. The wireless device is configured to determine that the wireless device is not connected to a WLAN access point included within a mobility set, start a timer, and attempt to establish a connection between the wireless device and at least one WLAN access point within the mobility set before an expiration of the timer. If the connection is established between the wireless device and the at least one WLAN access point within the mobility set before the expiration of the timer, the wireless device is configured to stop the timer. If the connection is not established between the wireless device and the at least one WLAN access point within the mobility set before the expiration of the timer, the wireless device is configured to send a report to a network node to indicate a connection failure.

According to certain embodiments, a method by a network node for configuring a wireless device to report connection status is provided. The method includes transmitting, to a wireless device, a message related to a mobility set associated with a wireless device. The message prompts the wireless device to start a timer and attempt to establish a connection with at least one WLAN access point within the mobility set prior to the expiration of the timer. A report is received from the wireless device. The report indicates a connection failure after the wireless device is not able to establish the connection between the wireless device and the at least one WLAN access point within the mobility set before expiration of the timer.

According to certain embodiments, a network node for configuring a wireless device to report connection status is provided. The network node comprises an interface, a processor, and storage. The network node is configured to transmit, to a wireless device, a message related to a mobility set associated with a wireless device. The message prompts the wireless device to start a timer and attempt to establish a connection with at least one WLAN access point within the mobility set prior to the expiration of the timer. A report is received from the wireless device. The report indicates a connection failure after the wireless device is not able to establish the connection between the wireless device and the at least one WLAN access point within the mobility set before expiration of the timer.

Also disclosed is a computer program comprising computer readable instructions for causing a programmable processor to perform the above methods for reporting a connection status and configuring a wireless device to report connection status. Also disclosed is a computer program product comprising a computer-readable medium storing the above computer programs.

Certain embodiments of the present disclosure may provide one or more technical advantages. For example, certain embodiments may allow a network node to control if and how a wireless device shall use a mobility set. Another technical advantage may ensure that a wireless device does not continue to search for and attempt to connect to a WLAN access point after an attempt to connect to such WLAN access point results in a failure. Still another technical advantage may be that a wireless device is preventing from sending additional failure reports to a network node after the connection status report is initially reported. Avoiding repetitive reporting may not only saves radio resources but also ensure that the network node is in control of the behavior of wireless device. For example, a further technical advantage may be that, in particular embodiments, a wireless device does not attempt to connect to WLAN access points unless the network node has requested the wireless device to do so.

Still another technical advantage may be that receipt of a failure indication from a wireless device may enable a network node to thereafter choose different WLAN access points for the wireless device. As a result, a further technical advantage may be that a wireless device is configured with an updated WLAN mobility set and LWA operation may be successfully resumed after a reported failure.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

The embodiments disclosed herein are described within the context of integration of LTE and WLAN. It should be understood that the problems and solutions described herein are equally applicable to wireless access networks and wireless devices implementing other access technologies and standards. Thus, LTE and WLAN are used as example technologies for the general purpose of demonstrating the problems with conventional connection status reporting and solutions for solving these problems. However, the techniques and methods described herein may be implemented in other network setups.

Further, the connection status report is described as being used for the feature of LTE-WLAN integration (LWA). It is recognized, however, that connection status reporting may also be used for other features and may be particularly useful when an eNB or other network node is in control of if and/or when the wireless device shall use WLAN.

Particular embodiments are described in FIGS. 1-8 of the drawings, like numerals being used for like and corresponding parts of the various drawings. Other embodiments, however, are within the scope of this disclosure and the techniques and methods described herein should not be construed as being limited to only the embodiments set described herein; rather, the described embodiments are provided only as examples.

Figure 1:
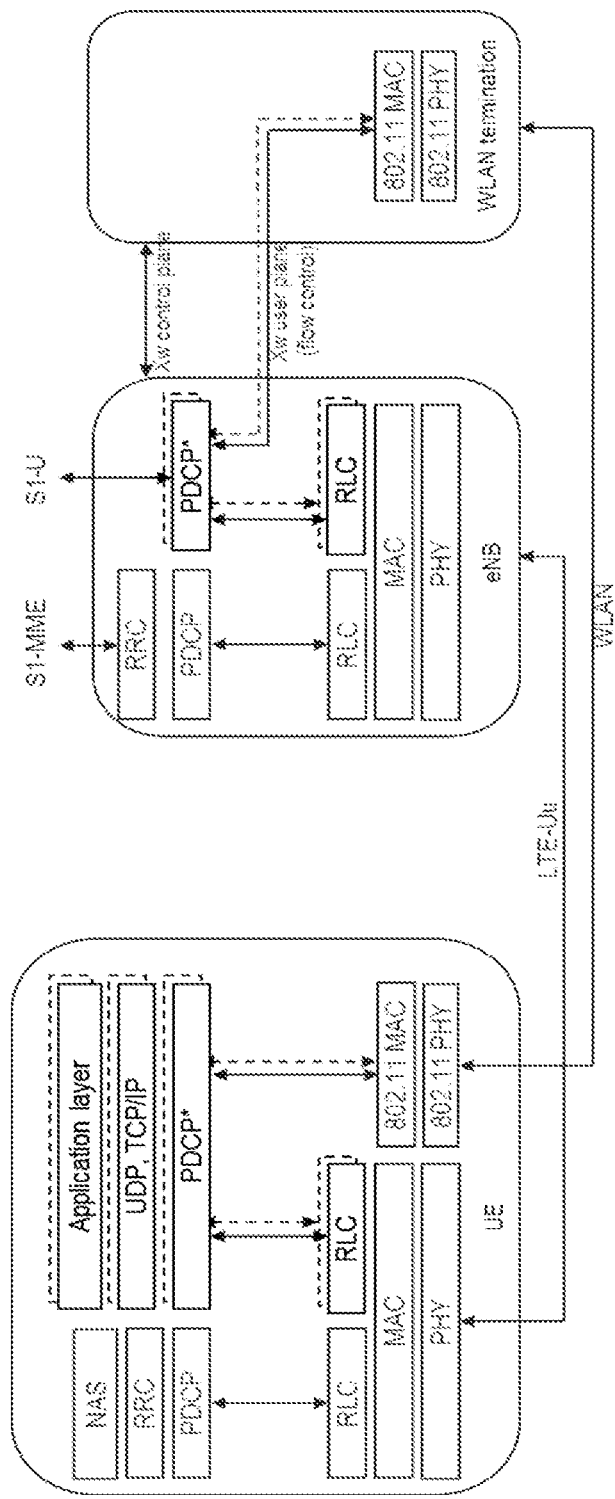
FIG. 1 is a block diagram illustrating an example protocol architecture for LTE-WLAN aggregation.
Figure 2:
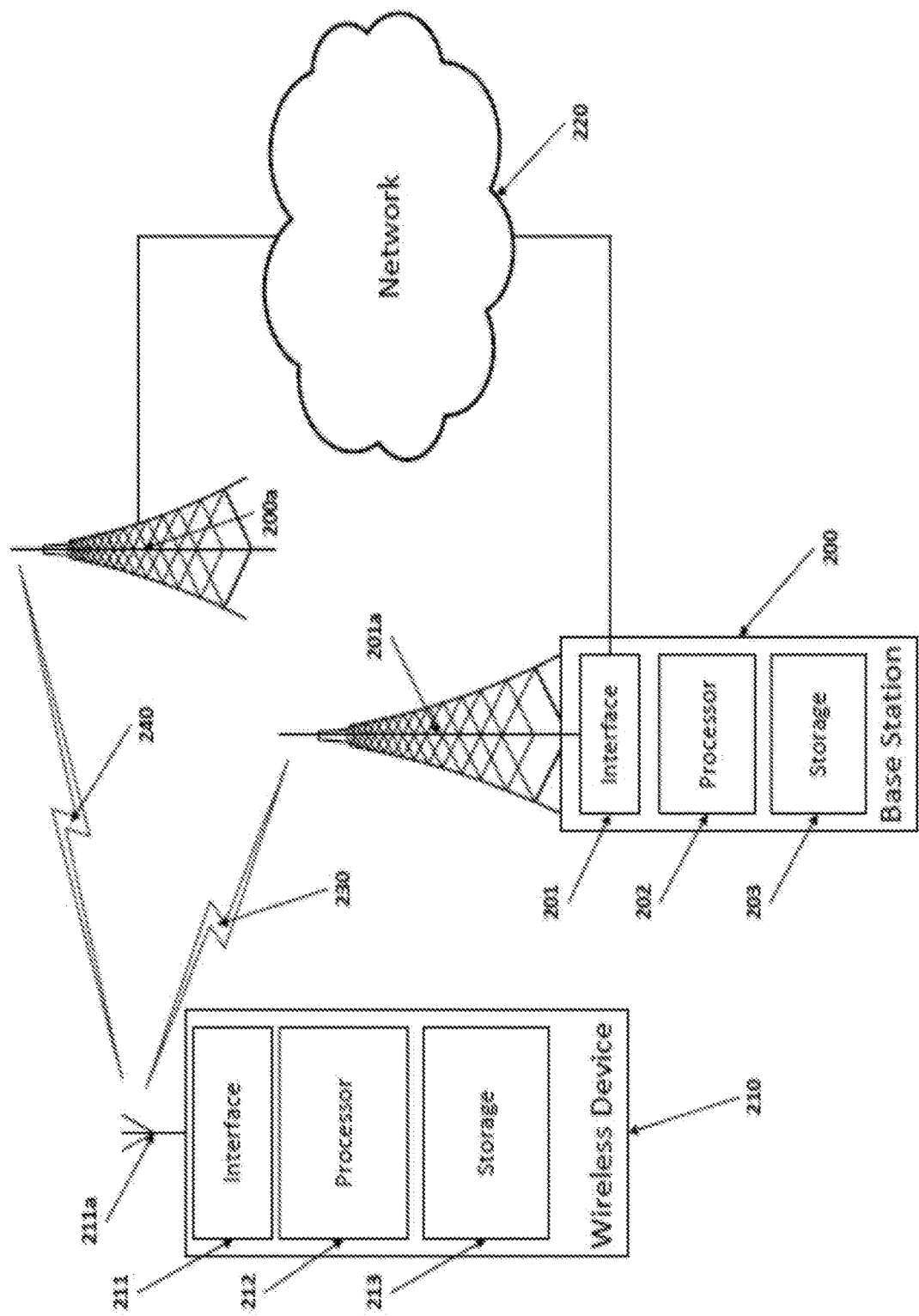
FIG. 2 is a block diagram illustrating an example embodiment of a network for connection status reporting for wireless land area network (WLAN), in accordance with certain embodiments.

The techniques for connection status reporting as disclosed herein may be implemented by a wireless network. FIG. 2 is a block diagram illustrating an example embodiment of a wireless network for WLAN connection status reporting, in accordance with certain embodiments. For simplicity, FIG. 2 only depicts network 220, network nodes 200 and 200a, and wireless device 210. Wireless device 210 may communicate with network nodes 200 and 200a over a wireless interface. For example, wireless device 210 may transmit wireless signals to one or more of network nodes 200 and 200a and/or receive wireless signals from one or more of network nodes 200 and 200a. The wireless signals may contain voice traffic, data traffic, control signals, and/or any other suitable information. In some embodiments, an area of wireless signal coverage associated with a network node 200 or 200a may be referred to as a cell. In some embodiments, wireless device 210 may have device-to-device (D2D) capability. Thus, wireless device 210 may be able to receive signals from and/or transmit signals directly to another wireless device. For example, wireless device 210 may be able to receive signals from and/or transmit signals to another wireless device 210.

In certain embodiments, network nodes 200 and 200a may interface with a radio network controller (not depicted in FIG. 2). The radio network controller may control network nodes 200 and 200a and may provide certain radio resource management functions, mobility management functions, and/or other suitable functions. In certain embodiments, the functions of the radio network controller may be included in network node 200 and/or 200a. The radio network controller may interface with a core network node. In certain embodiments, the radio network controller may interface with the core network node via an interconnecting network, such as network 220. The interconnecting network may refer to any interconnecting system capable of transmitting audio, video, signals, data, messages, or any combination of the preceding. Network 220 may comprise one or more IP networks, public switched telephone networks (PSTNs), public or private data networks, optical networks, local area networks (LANs), metropolitan area networks (MANs), wide area networks (WANs), local, regional, or global communication or computer networks such as the Internet, wireline or wireless networks, an enterprise intranet, or any other suitable communication link or network, including combinations thereof.

In some embodiments, a core network node (not depicted) may manage the establishment of communication sessions and various other functionalities for wireless device 210. Wireless device 210 may exchange certain signals with the core network node using the non-access stratum layer. In non-access stratum signaling, signals between wireless device 210 and the core network node may be transparently passed through the radio access network. In certain embodiments, network node 200 and/or 200a may interface with one or more network nodes over an internode interface. For example, network nodes 200 and 200a may interface over an X2 interface (not depicted).

As described above, example embodiments of the wireless network may include one or more wireless devices 210 and one or more different types of network nodes 200 and 200a capable of directly or indirectly communicating with wireless devices 210. Network nodes 200 and 200a may be any type of radio network nodes or any network nodes and may include Node Bs, base stations (BSs), multi-standard radio (MSR) radio nodes such as MSR BS, eNode Bs, network controllers, radio network controllers (RNCs), base station controllers (BSCs), relay donor nodes controlling relay, base transceiver stations (BTSs), access points (APs), transmission points, transmission nodes, RRUs, RRHs, nodes in distributed antenna system (DAS), core network nodes (e.g. MSC, MME etc), O&M, OSS, SON, positioning nodes (e.g. E-SMLC), MDTs, or any suitable network nodes. Also, in some embodiments, generic terminology, "radio network node" (or simply "network node") is used. Network node 200 may be also interchangeably referred to as eNodeB (eNB) 200.

Network nodes 200 and 215 may be deployed throughout the wireless network as a homogenous deployment, heterogeneous deployment, or mixed deployment. A homogeneous deployment may generally describe a deployment made up of the same (or similar) type of network nodes 200 and 215 and/or similar coverage and cell sizes and inter-site distances. A heterogeneous deployment may generally describe deployments using a variety of types of network nodes 200 and 215 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

As depicted, network node 200 includes processor 202, storage 203, interface 201, and antenna 201a. These components are depicted as single boxes located within a single larger box. In practice, however, a network node 200 may include multiple different physical components that make up a single illustrated component. For example, interface 201 may comprise terminals for coupling wires for a wired connection and a radio transceiver for a wireless connection. As another example, network node 200 may be a virtual network node in which multiple different physically separate components interact to provide the functionality of network node 200. For example, processor 202 may comprise three separate processors located in three separate enclosures, where each processor is responsible for a different function for a particular instance of network node 200. Similarly, network node 200 may be composed of multiple physically separate components. For example, network node 200 may be composed of a NodeB component and a radio network controller (RNC) component, a base transceiver station (BTS) component and a base station controller (BSC) component, and/or other suitable components, which may each have their own respective processor, storage, and interface components. In certain scenarios in which network node 200 comprises multiple separate components, one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201 may be shared by the RATs).

In some embodiments, wireless signals are transmitted to and receiving wireless signals from wireless device 110 via antenna 201a, processor 202 executes instructions to provide some or all of the functionality described above as being provided by network node 200, storage 203 stores the instructions executed by processor 201 and interface 1140 communicates signals to backend network components, such as a gateway, switch, router, Internet, Public Switched Telephone Network (PSTN), core network nodes or radio network controllers, etc. In certain embodiments, network node 200 may be capable of using multi-antenna techniques, and may be equipped with multiple antennas and capable of supporting Multiple Input Multiple Output (MIMO) techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 202 may be a combination of one or more of one or more computers, microprocessors, controllers, microcontrollers, CPUs, digital signal processors, application specific integrated circuits, field programmable gate arrays, applications, logic, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device 210, including any of the features or benefits disclosed herein.

Storage 203 may comprise any form of volatile or non-volatile computer readable, non-transitory memory and is generally operable to store instructions, such as a computer program, software, an application including one or more of logic, rules, algorithms, code, tables, and/or other instructions capable of being executed by a processor. Storage 203 may comprise any form of volatile or non-volatile computer readable, non-transitory memory including, without limitation, persistent storage, solid state memory, remotely mounted memory, magnetic media, optical media, computer memory (for example, RAM and/or ROM), mass storage media (for example, a hard disk), removable media (for example, a CD or DVD), and/or any other suitable local or remote, volatile or non-volatile, non-transitory computer-readable and/or computer/executable memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201. In some embodiments, network interface 201 is communicatively coupled to processor 202 and may refer to any suitable device operable to receive input for network node 200, send output from network node 200, perform suitable processing of the input or output or both, communicate to other devices, or any combination of the preceding. Network interface 201 may include appropriate hardware (e.g., port, modem, network interface card, etc.) and software, including protocol conversion and data processing capabilities, to communicate through a network. In certain embodiments, for example, interface 201 which may be used in the wired or wireless communication of signaling and/or data between network node 200, network 220, and/or wireless device 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or wireless devices via a wireless connection. The radio may convert the digital data into a radio signal having the appropriate channel and bandwidth parameters. The radio signal may then be transmitted via antenna 201a to the appropriate recipient, such as, for example, wireless device 210.

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Other embodiments of network node 200 may include additional components beyond those shown in FIG. 2 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Wireless device 210 may refer to any type of wireless device capable of communicating with network nodes 200 and 200a or other wireless devices 210 over radio signals. Examples of wireless device 210 include a wireless endpoint, a mobile station, a mobile phone, a cell phone, a wireless local loop phone, a smart phone, a PDA (Personal Digital Assistant), a desktop computer, a portable computer (e.g., laptop, tablet), a VoIP phone or handset, a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 910 may also be interchangeably referred to as referred to as user equipment (UE), a station (STA), a device, or a terminal in some embodiments.

As depicted, wireless device includes processor 212, storage 213, interface 211, and antenna 211a. Like network node 200, the components of wireless device 210 are depicted as single boxes located within a single larger box. However, in practice, a wireless device may comprises multiple different physical components that make up a single illustrated component. For example, storage 213 may comprise multiple discrete microchips, each microchip representing a portion of the total storage capacity.

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic implemented in one or more modules to execute instructions to manipulate data to provide, either alone or in combination with other wireless device 210 components, such as storage 213, wireless device 210 functionality. In some embodiments, processor 212 executes instructions to provide some or all of the functionality described above as being provided by wireless device 210. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), mass storage media (for example, a hard disk), removable storage media (for example, a Compact Disk (CD) or a Digital Video Disk (DVD)), or any other suitable volatile or non-volatile, non-transitory computer-readable and/or computer-executable memory devices that store information. Storage 213 may store any suitable data, instructions, or information, including software and encoded logic, utilized by wireless device 210. Storage 213 may be used to store any calculations made by processor 212 and/or any data received via interface 211.

Interface 211 may be used in the wireless communication of signaling and/or data between wireless device 210 and network node 200. For example, interface 211 may perform any formatting, coding, or translating that may be needed to allow wireless device 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Other embodiments of wireless device 210 may include additional components beyond those shown in FIG. 2 that may be responsible for providing certain aspects of the wireless device's functionality, including any of the functionality described above and/or any additional functionality (including any functionality necessary to support the solution described above).

The terminology such as network node and wireless device should be considering non-limiting and does in particular not imply a certain hierarchical relation between the two In general, network node or eNodeB could be considered as device 1, and wireless device or UE may be considered device 2. Alternatively, network node or eNodeB could be considered as device 2, and wireless device or UE may be considered device 1. Regardless, the two devices may communicate with each other over some radio channel.

Although FIG. 2 illustrates a particular arrangement of wireless network, the present disclosure contemplates that the various embodiments described herein may be applied to a variety of networks having any suitable configuration. For example, the wireless network may include any suitable number of wireless devices 210 and network nodes 200 and 200a, as well as any additional elements suitable to support communication between wireless devices or between a wireless device and another communication device (such as a landline telephone). Furthermore, although certain embodiments may be described as implemented in a LTE network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

Figure 3:
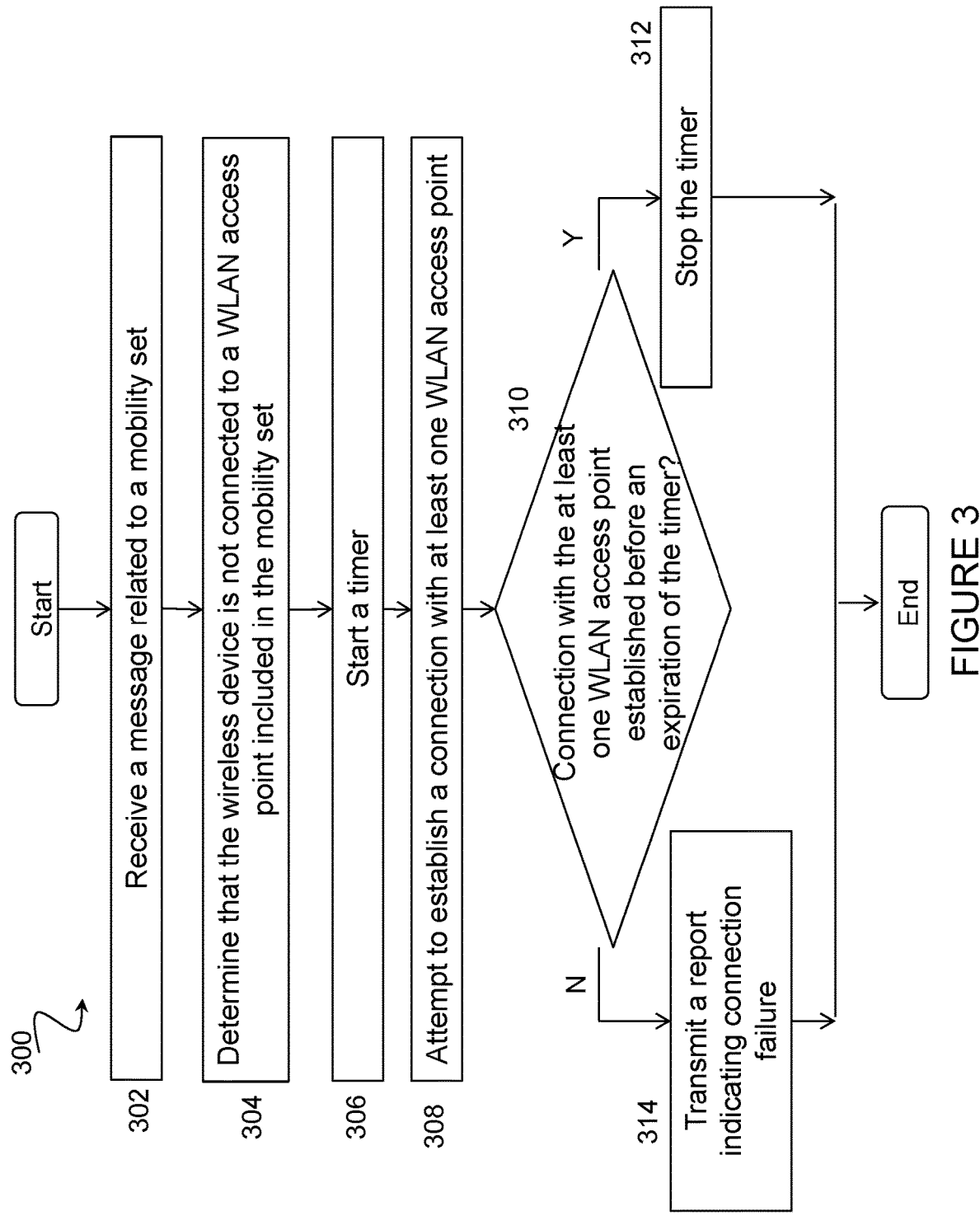
FIG. 3 is a flow diagram of an example method by a wireless device for reporting connection status for WLAN, in accordance with certain embodiments.

In certain embodiments, wireless device 210 may be configured for reporting WLAN connection status. FIG. 3 is a flow diagram of an example method 300 by a wireless device 210 for reporting connection status for WLAN, in accordance with certain embodiments. In the depicted embodiment, the method begins at step 302 when wireless device 210 receives a message related to a mobility set.

In certain embodiments, the mobility set may include a set of WLAN identifiers provided to wireless device 210 by network node 200 or 200a. In particular embodiments, for example, WLAN APs may be identified by one or more basic service set identifiers (BSSID), homogeneous service set identifiers (HESSID), or extended service set identifiers (SSIDs). Wireless device 210 may be allowed to perform mobility between the WLANs in the mobility set transparently such that the LTE network does not need to be notified by wireless device 210 when wireless devices 210 moves between WLANs in the mobility set. Rather, wireless device 210 may be allowed to move freely between WLANs within the mobility set based on the wireless device's own decision or based on an indication from the network.

In certain embodiments, the message may include a new mobility set. In certain other embodiments, the message may include an update to an existing mobility set maintained by wireless device 210. In a particular embodiment, the message may remove and/or add one or more WLAN AP identifiers from the mobility set. Where the update identifies one or more WLAN access points for removal from the mobility set, wireless device 210 may update the mobility set maintained by wireless device 210. Specifically, wireless device 210 may remove or add the one or more WLAN access points from the mobility set as indicated by the update message. A WLAN access point that is removed from the mobility set may be referred to herein as a removed WLAN access point or a removed WLAN. A WLAN that is added to the mobility set may be referred to herein as an added WLAN access point or an added WLAN.

At step 304, it is determined that wireless device 210 is not connected to a WLAN access point included within the mobility set. In certain embodiments, where the message is a new mobility set, wireless device 210 would not be connected to any WLAN access point and, thus, would be determined to be not connected to a WLAN access point within the new mobility set.

In certain embodiments, where the message is an update to the mobility set that removes a WLAN access point from the mobility set, determining that wireless device 210 is not connected to a WLAN access point included within the mobility set may include determining that wireless device 210 is connected to a removed WLAN access point. Stated differently, where wireless device 210 was connected to a WLAN access point within the mobility set prior to the update and such WLAN access point was removed by the message including the update, wireless device 210 is now said to not be connected to a WLAN access point within the mobility set.

In certain embodiments, it may be determined that a WLAN access point is "in" the mobility set if the WLAN access point has an identifier which matches an identifier in the mobility set. Alternatively, in certain other embodiments, each entry in the mobility set may be a combination of WLAN identifiers. In that case, it may be determined that a WLAN is "in" the mobility set when the WLAN access point matches all identifiers of such a combination of WLAN identifiers. For example, in a particular embodiment, the mobility set may be as follows:

Mobility set entry 1:
      SSID X
    Mobility set entry 2:
      HESSID A
      SSID Y In certain embodiments, any WLAN access point being associated with SSID X would match entry 1 in the mobility set and thus be determined to be "in" the mobility set. However, any WLAN access point having an identifier matching both HESSID A and SSID Y would match the second entry of the mobility set. However, a WLAN access point that matched only HESSID A but not SSID Y may be determined to be outside the mobility set. Likewise, if the message updating the mobility set removed the WLAN access point associated with SSID Z, that WLAN access point would be outside the mobility set. Accordingly, any wireless device 210 connected to SSID Z would also be connected to a WLAN access point outside the mobility set and wireless device 210 may be said to be "not connected" to a WLAN access point within the mobility set. It is recognized that other methods for defining which WLANs are "in" a mobility set may be used, and the methods and techniques described herein may be equally applicable.

At step 306, a timer is started. In a particular embodiment, the timer may include a T351 timer. In certain embodiments, the timer may be started only where the message received at step 302 does not result in an empty mobility set.

At step 308, wireless device 210 attempts to establish a connection with at least one WLAN access point within the mobility set. Wireless device 210 then determines, at step 310, whether the connection with the at least one WLAN access point has been established prior to the expiration of the timer.

If a successful connection is established with at least one WLAN access point prior to the expiration of the timer, the method proceeds to step 312 where the timer is stopped. In certain embodiments, the timer may be stopped before the timer has reached its end where a successful connection is established.

Conversely, if a successful connection is not established with the at least one WLAN access point prior to the expiration of the timer, the method may proceed to step 314 where a report is transmitted to network node 200 to indicate a connection failure.

Figure 4:
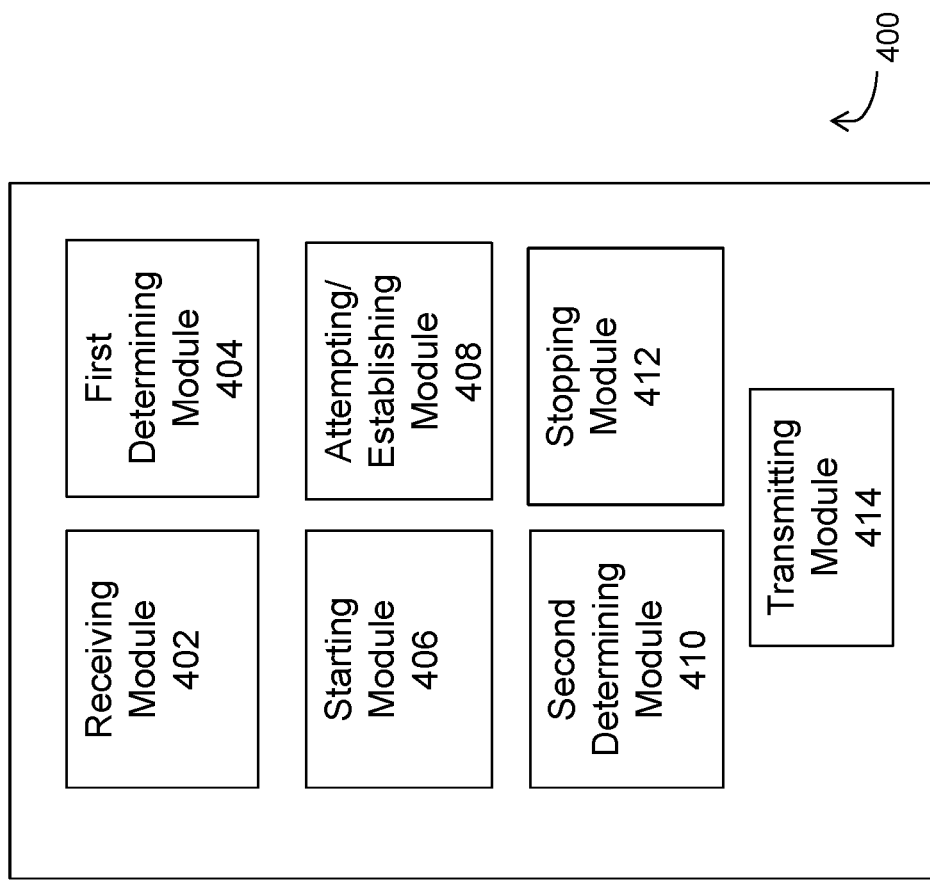
FIG. 4 is a block diagram illustrating an example virtual computing device for reporting connection status for WLAN, in accordance with certain embodiments.

In certain embodiments, the method for reporting connection status for WLAN as described above may be performed by a virtual computing device. FIG. 4 is a block diagram illustrating an example virtual computing device 400 for reporting connection status for WLAN, in accordance with certain embodiments. In certain embodiments, virtual computing device 400 may include modules for performing steps similar to those described above with regard to the method illustrated and described in FIG. 3. For example, virtual computing device 400 may include a receiving module 402, a first determining module 404, a starting module 406, an attempting module 408, a second determining module 410, a stopping module 412, a transmitting module 414, and any other suitable modules for reporting connection status for WLAN. In some embodiments, one or more of the modules may be implemented using one or more processors of FIG. 2. In certain embodiments, the functions of two or more of the various modules may be combined into a single module.

The receiving module 402 may perform the receiving functions of virtual computing device 400. For example, in a particular embodiment, receiving module 402 may receive a message related to a mobility set. For example, the term mobility set may include a set of WLAN identifiers provided to wireless device 210 by network node 200 or 200a.

The first determining module 404 may perform some or all of the determining functions of virtual computing device 400. For example, in a particular embodiment, first determining module 404 may determine that wireless device 210 is not connected to a WLAN access point included within the mobility set. More specifically, in a particular embodiment where the message is an update to the mobility set that removes a WLAN access point from the mobility set, determining module 404 may determine that wireless device 210 is connected to a removed WLAN access point.

The starting module 406 may perform the starting functions of virtual computing device 400. For example, in a particular embodiment, starting module 406 may start a timer.

The attempting/establishing module 408 may perform the attempting/establishing functions of virtual computing device 408. For example, in a particular embodiment, attempting/establishing module 408 may attempt to establish and/or establish a connection with at least one WLAN access point within the mobility set.

The second determining module 410 may perform some or all of the determining functions of virtual computing device 410. For example, in a particular embodiment, second determining module 410 may determine whether the connection with the at least one WLAN was established prior to the expiration of the timer.

The stopping module 412 may perform the stopping functions of virtual computing device 412. For example, in a particular embodiment, stopping module 410 may stop the timer if a successful connection was established with at least one WLAN in the mobility set before the expiration of the timer.

The transmitting module 414 may perform some or all of the transmitting functions of virtual computing device 414. For example, in a particular embodiment, transmitting module 414 may transmit a report to network node 200 that indicates a connection failure if a successful connection is not established with the at least one WLAN in the mobility set before the expiration of the timer.

Other embodiments of virtual computing device 400 may include additional components beyond those shown in FIG. 4 that may be responsible for providing certain aspects of the wireless device's functionality, including any of the functionality described above and/or any additional functionality (including any functionality necessary to support the solutions described above). The various different types of wireless devices 210 may include components having the same physical hardware but configured (e.g., via programming) to support different radio access technologies, or may represent partly or entirely different physical components.

Figure 5:
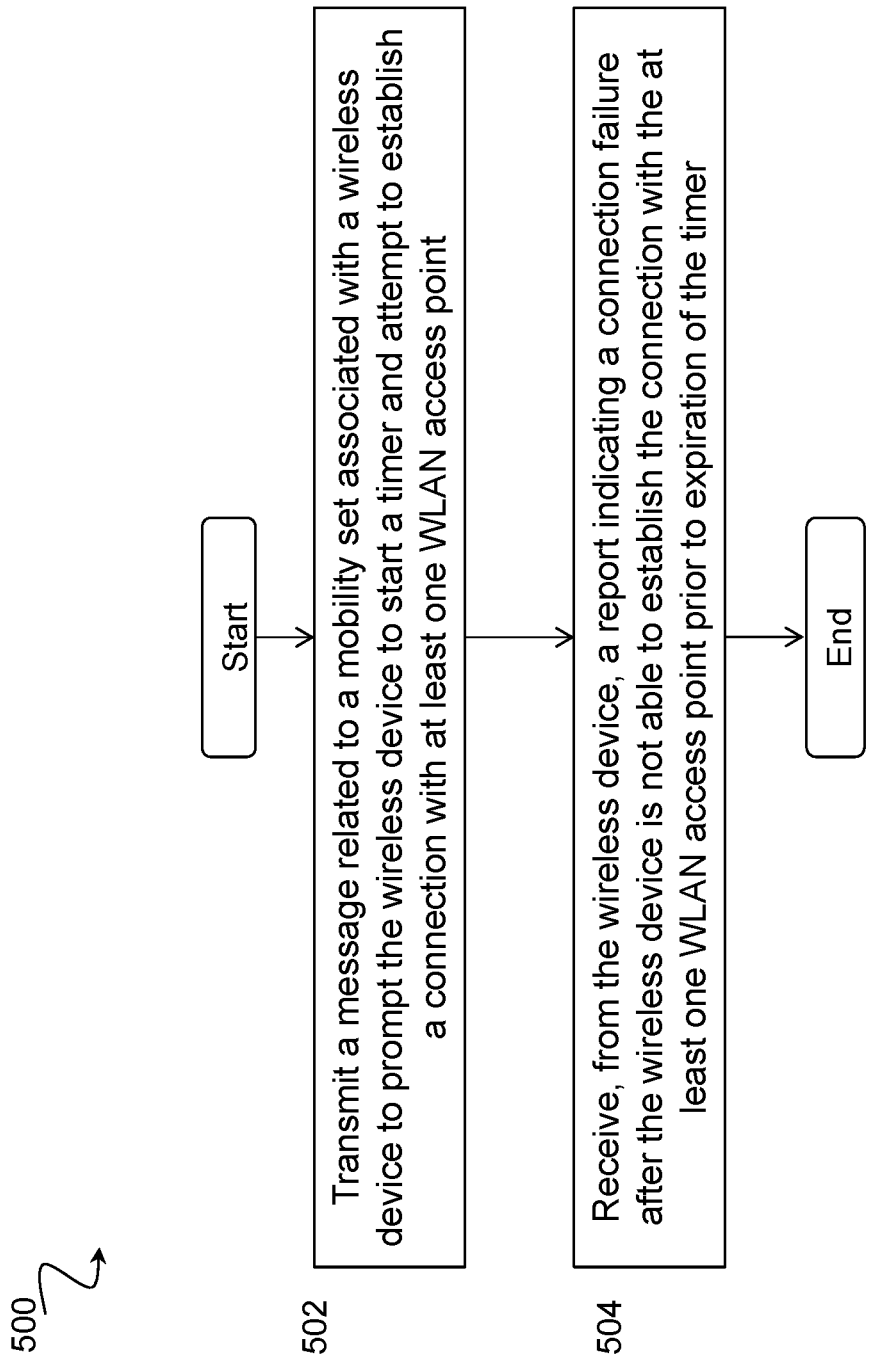
FIG. 5 is a flow diagram of an example method by a network node for configuring a wireless device to report connection status for WLAN, in accordance with certain embodiments.

As stated above, wireless device 210 may be configured to report a connection status in response to the removal of a WLAN. FIG. 5 is a flow diagram of an example method 500 by a network node 200 for configuring a wireless device 210 to report connection status for WLAN, in accordance with certain embodiments. In the depicted embodiment, the method begins at step 502 when network node 210 transmits a message related to a mobility set associated with wireless device 200. The message may prompt wireless device 210 to start a timer and attempt to establish a connection with at least one WLAN access point within the nobility set.

In a particular embodiment, the message may include a new mobility set. In other embodiments, the message may include an update to a mobility set maintained by wireless device 210. For example, the message may identify a WLAN access point for removal from the mobility set. Alternatively or additionally, the message may identify a WLAN access point to be added to the mobility set.

At step 504, network node 200 receives a report from wireless device 210. The report may indicate a connection failure after wireless device 210 is not able to establish a connection with the at least one WLAN access point prior to expiration of the timer. In a particular embodiment, report may additionally indicate that wireless device 210 was connected to a removed WLAN access point prior to the message related to the mobility was received and that removal of the WLAN access point from the mobility set resulted in a connection failure.

Figure 6:
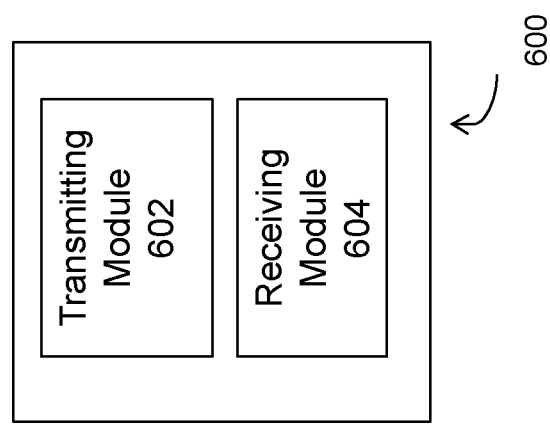
FIG. 6 is a block diagram illustrating an example virtual computing device for configuring a wireless device to report connection status for WLAN, in accordance with certain embodiments.

In certain embodiments, the method for configuring a wireless device 210 to report connection status for WLAN as described above may be performed by a virtual computing device. FIG. 6 is a block diagram illustrating an example virtual computing device 600 for configuring a wireless device 210 to report connection status for WLAN, in accordance with certain embodiments. In certain embodiments, virtual computing device 600 may include modules for performing steps similar to those described above with regard to the method illustrated and described in FIG. 5. For example, virtual computing device 600 may include a transmitting module 602, a receiving module 604, and any other suitable modules for configuring a wireless device 210 to report connection status for WLAN. In some embodiments, one or more of the modules may be implemented using one or more processors of FIG. 2. In certain embodiments, the functions of two or more of the various modules may be combined into a single module.

The transmitting module 602 may perform the transmitting functions of virtual computing device 600. For example, in a particular embodiment, transmitting module 602 may transmit a message related to a mobility set associated with wireless device 200. The message may prompt wireless device 210 to start a timer and attempt to establish a connection with at least one WLAN access point within the nobility set.

The receiving module 604 may perform the receiving functions of virtual computing device 600. For example, in a particular embodiment, receiving module 604 may receive a report from wireless device 210. The report may indicate a connection failure after wireless device 210 is not able to establish a connection with the at least one WLAN access point prior to expiration of the timer.

Other embodiments of virtual computing device 600 may include additional components beyond those shown in FIG. 6 that may be responsible for providing certain aspects of the network node's functionality, including any of the functionality described above and/or any additional functionality (including any functionality necessary to support the solutions described above). The various different types of network nodes 200 may include components having the same physical hardware but configured (e.g., via programming) to support different radio access technologies, or may represent partly or entirely different physical components.

In certain embodiments, network node 200 may configure wireless device 210 to send connection status reports unconditionally. For example, where a successful connection is established by wireless device 210, wireless device 210 may be configured to send a successful connection report to report successful connections whether or not any other connection attempts failed. Similarly, wireless device 210 may be configured to send an unsuccessful connection report to report unsuccessful connections whether or not any other connection attempts succeeded.

In certain other embodiments, network node 200 may configure wireless device 210 to send connection status reports upon removal of a WLAN access point from the mobility set. In a particular embodiment, upon removal of a WLAN from the mobility set, wireless device 210 may send a status report message, for example indicating "connection success," to network node 200 if wireless device 210 was not connected to the removed WLAN access point prior to the removal of the WLAN access point from the mobility set. In a particular embodiment, the message may include an indication of which WLAN access point the wireless device 210 is connected.

If, on the other hand, wireless device 210 is connected to the removed WLAN access point, wireless device 210 may start a timer and attempt to find another WLAN access point to connect to. As described above, the timer may be stopped when wireless device 210 is able to connect to another WLAN access point in the mobility set. In a particular embodiment, the timer may be stopped even if it has not reached its end. Conversely, if the timer runs out or expires before a connection is established, a connection status report may be triggered to indicate to network node 200 that the connection failed.

In certain embodiments, it may be configurable by network node 200, whether wireless device 110 should send the connection status report directly after a failure or after the timer expires. Thus, network node 200 may configure wireless device 210 to send a WLAN connection status report directly after each successful and/or failed connection attempt. In certain other embodiments, network node 200 may configure wireless device 210 to send the WLAN connection status report only after the timer expires.

Consider an example wherein a mobility set contains WLAN A and WLAN B and wireless device 210 is connected to WLAN A. If the mobility set is updated such that WLAN B is removed from the mobility set, wireless device 210 may continue to maintain a connection with WLAN A. If wireless device 210 is configured to send a successful connection report, wireless device 210 may send a status report indicating success connection to WLAN A. Conversely, if the mobility set is updated such that WLAN A is removed from the mobility set, wireless device's connection with WLAN A may be terminated. Wireless device 210 may start the timer and attempt to connect to WLAN B.

In certain particular embodiments, wireless device 210 may be configured to only take actions for removal of WLANS form the mobility set if the resulting mobility set is non-empty. Thus, wireless device 210 may only send a connection status report if at least one entry remains in the mobility set after a WLAN access point is removed from the mobility set. Thus, in a particular embodiment in which a WLAN is removed from the mobility set, wireless device 210 may send a connection status report message to network node 200 if wireless device 210 is not connected to the removed WLAN and there is at least one WLAN in the resulting mobility set. The report may include an indication of which WLAN wireless device 210 is connected to. In the above example, the report might indicate that wireless device is connected to WLAN A. Conversely, where wireless device 210 is connected to the removed WLAN, wireless device 210 may start a timer and attempt to find another WLAN to connect to if there is at least one WLAN in the resulting mobility set. If a successful connection is obtained, a connection status report may not be sent to network node 200. Alternatively, a connection status report may be sent to network node 200 to indicate that connection to the removed WLAN failed even where a successful connection is then obtained to a WLAN other than the removed WLAN.

A modification to 3GPP TS 36.331 v 13.0.0 to implement the above-described feature for reporting a connection status conditioned upon a non-empty mobility set is provided below:

The UE shall:
    1>if WLAN connection is successful; or
    1>if one or more WLANs are removed from the mobility set but the UE
        is not connected to any of the removed WLANs:
        2> set the status in VarWLAN-Status to successfulAssociation;
        2> set the wlan-IdentifiersAssociated in VarWLAN-Status to the one belonging to the successfully connected WLAN;
        2> if timer T351 is running:
            3>stop timer T351;
            3> perform WLAN Connection Status Reporting procedure in 5.6.X.3;
    1> if one or more (but not all) WLANs are removed from the mobility set and the UE is connected to a removed WLAN:
        2>start timer T351;
    1> if the UE fails to connect to or maintain a connection to a WLAN in the mobility set:
        2>  add an entry in failedWLANConnectionAttemptsList in VarWLAN-Status:
            3> if the failure is due to internal UE problems related to WLAN (e.g. connection to another WLAN based on user preferences or user turning off WLAN connection):
                4>set the causeValue in VarWLAN-Status to failureInternal;
                4>perform WLAN Connection Status Reporting procedure in 5.6.Y.3;
            3> else:
                4> if the failure is due to WLAN radio link issues:
                    5>set the causeValue in VarWLAN-Status to failureRadioLink;
                4> else if the failure is due to connection rejection from WLAN:
                    5> set the causeValue in VarWLAN-Status to failureConnReject;
                4> else:
                    5>set the causeValue in VarWLAN-Status to failureOther;

In this example, wireless device 210 determines if wireless device 210 is connected to a removed WLAN and if this is not the case it will trigger the "WLAN Connection Status Reporting procedure." Wireless device 210 then sends the report. In this example scenario, such a report will contain a success-indication. If on the other hand, some (but not all) WLANs are removed from the mobility set and wireless device 210 is connected to such removed WLAN, wireless device 210 starts the timer.

In certain embodiments, wireless device 210 may be configured for connection status reporting in response to internal failures of the wireless device 210. Such reports may be triggered and transmitted where the failure is not a result of a removal of a WLAN from the mobility set by network node 200. Similar to the embodiments described above, the connection failure may trigger a connection status report to be transmitted immediately upon and as a direct result of the failed connection. In other embodiments, wireless device 210 may be configured to start a timer. The failure indication may not be sent directly upon detection of the failure but only after expiration of the timer. Accordingly, if, for example, wireless device 210 turns off its WLAN chip for only a short period of time and then turns the WLAN chip on again before expiration of the timer, a report may not be transmitted if a connection to a WLAN of the mobility set is successfully established. As such, network node 200 may not be informed of temporal outage and radio resources may be saved.

In certain embodiments, connection status reports may be suppressed when no mobility set is configured. For example, in a particular embodiment, wireless device 210 may suppress any status reports when wireless device 210 has no mobility set or the mobility set is empty. Such a configuration ensures that wireless device 210 does not send status report to network node 200 for WLAN connection attempts which may be triggered due to other reasons than the network node-controlled messages. For example, wireless device 210 may not sending a report if the end user attempted but failed to connect to its home WLAN. An example of how to implement such a feature by modifying 3GPP TS 36.331 v13.0.0 is shown below:
    The UE shall set the contents of the WLANConnectionStatusReport message as follows:

1>set wlan-status to status in VarWLAN-Status;
    1>set failureIndications to failedWLANConnectionAttemptsList in VarWLAN-Status (if existing);
    1>discard all entries in failedWLANConnectionAttemptsList in VarWLAN-Status;
    1>if WLAN mobility set has at least one entry: and
    1>if failureIndications has at least one entry or indicateSuccessfulConnections is configured:
        2>  submit the WLANConnectionStatusReport message to lower layers for transmission, upon which the procedure ends;

In certain embodiments, wireless device 210 may be configured to discard the WLAN mobility set at connection failure. For example, in a particular embodiment, wireless device 210 may discard a mobility set upon sending a connection status report that includes an indication with WLAN failures. Such a feature may be implemented by discarding and/or deleting the mobility set upon expiry of a timer used for determining how long a wireless device 210 should attempt to connect to WLAN access points in the mobility set. For example, if wireless device 210 loses a connection to a WLAN in the mobility set, wireless device 210 may be configured to attempt to try to connect to another WLAN in the mobility set, as described above. To avoid such an attempt from taking too long time, network node 200 may configure a timer for wireless device 210. Wireless device 210 should find and connect to a WLAN access point in the mobility set before the timer expires. If it does not, wireless device 210 may be configured to send a failure report to network node 200 and discard the WLAN mobility set. An example modification to 3GPP TS 36.331 v13.0.0 to implement such a feature is shown below:

The UE shall:
    1>if T351 expires:
        2>set the field associated in VarWLAN-MobilityConfig to false; set the field status in VarWLAN-Status to failureTimeout;
        2> perform WLAN Connection Status Reporting procedure in 5.6.X.3;
        2>  discard wlan-MobilitySet in VarWLAN-MobilityConfig;

Several of the features described herein allow network node 200 to control if and how wireless device 210 shall use a mobility set. By configuring wireless device 210 to discard the mobility set after failure, network node 200 ensures that wireless device 210 does not continue to find and connect to WLANs after wireless device 210 has indicated a failure. Such a configuration is also beneficial since wireless device will not be able to send additional failure reports to network node 200 after the connection status report indicating a failure. Avoiding repetitive reporting not only saves radio resources but also ensures that the network node 200 is in control of the behavior of wireless device 210. For example, wireless device 210 may not attempt to connect to WLANs unless network node 200 has requested the wireless device 210 to do so.

Additionally, receipt of a failure indication from wireless device 210 enables network node 200 to thereafter choose different WLAN access points for wireless device 210. As such, wireless device 210 may be configured with an updated WLAN mobility set and LWA operation may be successfully resumed.

As described above, certain embodiments may include a WLAN status reporting frame work that supports sending reports both due to failed connections and due to successful connections. In a particular embodiment, for example, wireless device 210 may be configured to send, in one report, both previous failed connection attempts as well as an indication that wireless device 210 is currently, successfully connected to a WLAN.

In certain other embodiments, however, the connection status reporting may be conditioned so as to reduce the amount of signaling overhead with regard to the status report. More specifically, wireless device 210 may conditionally send a report to network node 200 based on whether wireless device 210 has success-indications and/or failure-indications to report.

For example, according to a particular embodiment, network node 200 may configure wireless device 210 to send connection status reports only if there is at least one failed connection attempt to report. Thus, the report will be transmitted only if wireless device 210 has at least one failure indication to report to network node 200. If wireless device 210 has no failures to report, then wireless device 210 may suppress any report.

According to another embodiment, wireless device 210 may be configured to submit the connection status report if there is at least one failed connection attempt to report or if wireless device 200 is configured to transmit the report even if it only contains a success indication. An example of modification to 3GPP TS 36.331 v13.0.0 to implement this feature is provided below:

The UE shall set the contents of the WLANConnectionStatusReport message as follows:

```
1>set wlan-status to status in VarWLAN-Status;
1>set failureIndications to failedWLANConnectionAttemptsList in
    VarWLAN-Status (if existing);
1>discard all entries in failedWLANConnectionAttemptsList in
    VarWLAN-Status;
1>if WLAN mobility set has at least one entry: and
1>if failureIndications has at least one entry or
    indicateSuccessfulConnections is configured:
   2>  submit the WLANConnectionStatusReport message to lower layers
        for transmission, upon which the procedure ends;
```

In this example embodiment, wireless device 210 submits the report if there is at least one entry in a parameter "failureIndication," indicating there is at least one failed connection attempt to report. However, wireless device 210 also submits the report in case of a successful indication even though there are no failure indications to report. Such an embodiment is beneficial since in some scenarios, network node 200 may not need to know about only a successful indication since network node 200 may be able to determine successful connection by other means. For example, an indication from the WLAN network that an interface exists between the WLAN and network node 200 may imply a successful connection.

As to certain other embodiments, connection status reporting may be conditioned on no successful connection. Thus, wireless device 210 may send a report only if wireless device 210 has no success-indications to report. In other words, wireless device 210 may send the report only if all attempts to connect to WLAN access points have failed. Such an embodiment may further reduce overhead since wireless device 210 will only report to network node 200 if all attempts to connect to WLAN end in failure and, thus, wireless device 210 is unable to connect to a WLAN. This is useful in a scenario where network node 200 only uses the status report to determine if and/or when wireless device 210 needs to be provided with an updated mobility set. An example modification to 3GPP TS 36.331 v13.0.0 for implementation of such a feature is provided below:

The UE shall set the contents of the WLANConnectionStatusReport message as follows:

```
1>set wlan-status to status in VarWLAN-Status;
1>set failureIndications to failedWLANConnectionAttemptsList in
    VarWLAN-Status (if existing);
1>discard all entries in failedWLANConnectionAttemptsList in
    VarWLAN-Status;
1>if WLAN mobility set has at least one entry: and
1>if status in VarWLAN-Status is not successfulAssociation:
   2> submit the WLANConnectionStatusReport message to lower layers
        for transmission, upon which the procedure ends;
```

In this example, "status" is a variable which can be set to "successfulAssociation" when wireless device 210 is successfully connected to a WLAN.

Another example modification to 3GPP TS 36.331 v13.0.0 for implementation of such a feature is provided below:

The UE shall set the contents of the WLANConnectionStatusReport message as follows:

```
1>set wlan-status to status in VarWLAN-Status;
1>set failureIndications to failedWLANConnectionAttemptsList in
    VarWLAN-Status (if existing);
1>discard all entries in failedWLANConnectionAttemptsList in
    VarWLAN-Status;
1>if WLAN mobility set has at least one entry: and
1>if this procedure was triggered due to T351 expiry:
   2> submit the WLANConnectionStatusReport message to lower
        layers for transmission, upon which the procedure ends;
```

In this example, wireless device 210 only sends the status report if the timer expires and triggers generation and transmission of the report.

As stated above, any of these or other embodiments may configurable by network node 200. Thus wireless device 210 may be configured to send the WLAN connection status report in the cases of "connection success" according to any one or combination of the triggering conditions above.

According to certain embodiments, a method by a wireless device for reporting a connection status is provided that includes receiving a message from a network node. The message may be related to a mobility set associated with the wireless device. The wireless device may determine that the wireless device is not connected to a WLAN access point included within a mobility set. A timer may be started, and the wireless device may attempt to establish a connection between the wireless device and at least one WLAN access point within the mobility set before an expiration of the timer. If the connection is established between the wireless device and the at least one WLAN access point within the mobility set before the expiration of the timer, the timer may be stopped. If the connection is not established between the wireless device and the at least one WLAN access point within the mobility set before the expiration of the timer, a report may be sent to a network node to indicate a connection failure.

According to certain embodiments, a wireless device for reporting a connection status is provided. The wireless device comprises an interface, a processor, and storage. The wireless device is configured to receive a message from a network node. The message is related to a mobility set associated with the wireless device. The wireless device is configured to determine that the wireless device is not connected to a WLAN access point included within a mobility set, start a timer, and attempt to establish a connection between the wireless device and at least one WLAN access point within the mobility set before an expiration of the timer. If the connection is established between the wireless device and the at least one WLAN access point within the mobility set before the expiration of the timer, the wireless device is configured to stop the timer. If the connection is not established between the wireless device and the at least one WLAN access point within the mobility set before the expiration of the timer, the wireless device is configured to send a report to a network node to indicate a connection failure.

According to certain embodiments, a method by a network node for configuring a wireless device to report connection status is provided. The method includes transmitting, to a wireless device, a message related to a mobility set associated with a wireless device. The message prompts the wireless device to start a timer and attempt to establish a connection with at least one WLAN access point within the mobility set prior to the expiration of the timer. A report is received from the wireless device. The report indicates a connection failure after the wireless device is not able to establish the connection between the wireless device and the at least one WLAN access point within the mobility set before expiration of the timer.

According to certain embodiments, a network node for configuring a wireless device to report connection status is provided. The network node comprises an interface, a processor, and storage. The network node is configured to transmit, to a wireless device, a message related to a mobility set associated with a wireless device. The message prompts the wireless device to start a timer and attempt to establish a connection with at least one WLAN access point within the mobility set prior to the expiration of the timer. A report is received from the wireless device. The report indicates a connection failure after the wireless device is not able to establish the connection between the wireless device and the at least one WLAN access point within the mobility set before expiration of the timer.

Also disclosed is a computer program comprising computer readable instructions for causing a programmable processor to perform the above methods for reporting a connection status and configuring a wireless device to report connection status. Also disclosed is a computer program product comprising a computer-readable medium storing the above computer programs.

Certain embodiments of the present disclosure may provide one or more technical advantages. For example, certain embodiments may allow a network node to control if and how a wireless device shall use a mobility set. Another technical advantage may ensure that a wireless device does not continue to search for and attempt to connect to a WLAN access point after an attempt to connect to such WLAN access point results in a failure. Still another technical advantage may be that a wireless device is preventing from sending additional failure reports to a network node after the connection status report is initially reported. Avoiding repetitive reporting may not only saves radio resources but also ensure that the network node is in control of the behavior of wireless device. For example, a further technical advantage may be that, in particular embodiments, a wireless device does not attempt to connect to WLAN access points unless the network node has requested the wireless device to do so.

Still another technical advantage may be that receipt of a failure indication from a wireless device may enable a network node to thereafter choose different WLAN access points for the wireless device. As a result, a further technical advantage may be that a wireless device is configured with an updated WLAN mobility set and LWA operation may be successfully resumed after a reported failure.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. Any steps described herein are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein.

Any appropriate steps, methods, or functions may be performed through a computer program product that may, for example, be executed by the components and equipment illustrated in the figure above. For example, storage 203 may comprise computer readable means on which a computer program can be stored. The computer program may include instructions which cause processor 202 (and any operatively coupled entities and devices, such as interface 201 and storage 203) to execute methods according to embodiments described herein. The computer program and/or computer program product may thus provide means for performing any steps herein disclosed.

As described above, any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method by a wireless device for reporting a connection status, comprises:
   receiving a message from a network node, the message related to a mobility set associated with the wireless device;
   determining, by the wireless device, that the wireless device is not connected to a wireless local area network (WLAN) access point included within a mobility set;
   starting a timer;
   attempting, by the wireless device, to establish a connection between the wireless device and at least one WLAN access point within the mobility set before an expiration of the timer;
   if the connection is established between the wireless device and the at least one WLAN access point within the mobility set before the expiration of the timer:
      stopping the timer; and
      upon failing to establish a connection with at least one other WLAN access point within the mobility set, sending a report to the network node to indicate the at least one failure with the at least one other WLAN access point and the successful connection with the at least one WLAN access point; and
   if the connection is not established between the wireless device and the at least one WLAN access point within the mobility set before the expiration of the timer, sending a report to the network node to indicate a connection failure.

2. The method of claim 1, wherein:
   the message comprises an update to the mobility set, and
   the step of determining that the wireless device is connected to the at least one WLAN access point is performed in response to receiving the update to the mobility set.

3. The method of claim 2, wherein the update identifies that the at least one WLAN access point is to be removed from the mobility set, and the method further comprises:
   removing, by the wireless device, the at least one WLAN access point from the mobility set.

4. The method of claim 3, further comprising:
   determining that the mobility set is not empty after removing the at least one WLAN access point from the mobility set, and
   wherein the timer is started in response to determining that the mobility set is not empty after removing the at least one WLAN access point from the mobility set.

5. The method of claim 2, wherein the update identifies at least one additional WLAN access point to be added to the mobility set, and the method further comprises:
   adding, by the wireless device, the at least one additional WLAN access point to the mobility set.

6. The method of claim 1, wherein the mobility set comprises a list of one or more WLAN identifiers, each of the one or more WLAN identifiers associated with an WLAN access point to which the wireless device is configured to connect.

7. The method of claim 6, wherein each of the one or more WLAN identifiers is selected from the group consisting of:
   a basic service set identifier (BSSID);
   a homogeneous extended service set identifier (HESSID); and
   a service set identifier (SSID).

8. The method of claim 6, wherein determining that the wireless device is connected to the at least one WLAN access point comprises:
   determining that the wireless device is connected to a WLAN access point associated with a WLAN identifier that is not included in the list of the one or more WLAN identifiers.

9. The method of claim 1, wherein in response to a connection being established between the wireless device and the at least one WLAN access point within the mobility set before the expiration of the timer, the method further comprises:
   determining, by the wireless device, that the wireless device is configured to send a report indicating the establishment of a successful connection; and
   sending, to the network node, the report indicating the establishment of a successful connection with the at least one WLAN access point within the mobility set.

10. The method of claim 1, wherein the connection is not established between the wireless device and the at least one WLAN access point before the expiration of the timer, and the method further comprises:
    discarding the mobility set.

11. The method of claim 1, wherein the report indicates the connection failure after wireless device is not able to establish a connection between the wireless device and any WLAN within the mobility set.

12. A wireless device for reporting a connection status, the wireless device comprising an interface, a processor, and storage, the wireless device is configured to:
    receive a message from a network node, the message related to a mobility set associated with the wireless device;
    determine that the wireless device is not connected to a wireless local area network (WLAN) access point included within a mobility set;
    start a timer;
    attempt to establish a connection between the wireless device and at least one WLAN access point within the mobility set before an expiration of the timer;
    if the connection is established between the wireless device and the at least one WLAN access point within the mobility set before the expiration of the timer:
    stop the timer; and
    upon failing to establish a connection with at least one other WLAN access point within the mobility set, sending a report to the network node to indicate the at least one failure with the at least one other WLAN access point and the successful connection with the at least one WLAN access point; and
    if the connection is not established between the wireless device and the at least one WLAN access point within the mobility set before the expiration of the timer, send a report to the network node to indicate a connection failure.

13. The wireless device of claim 12, wherein:
    the message comprises an update to the mobility set, and
    the step of determining that the wireless device is connected to the at least one WLAN access point is performed in response to receiving the update to the mobility set.

14. The wireless device of claim 13, wherein:
    the update identifies that the at least one WLAN access point is to be removed from the mobility set; and the wireless device is further configured to remove the at least one WLAN access point from the mobility set.

15. The wireless device of claim 14, further configured to determine that the mobility set is not empty after removing the at least one WLAN access point from the mobility set, and wherein the timer is started in response to determining that the mobility set is not empty after removing the at least one WLAN access point from the mobility set.

16. The wireless device of claim 12, wherein the update identifies at least one additional WLAN access point to be added to the mobility set, and the wireless device is further configured to add the at least one additional WLAN access point to the mobility set.

17. The wireless device of claim 12, wherein the mobility set comprises a list of one or more WLAN identifiers, each of the one or more WLAN identifiers associated with an WLAN access point to which the wireless device is configured to connect.

18. The wireless device of claim 17, wherein each of the one or more WLAN identifiers is selected from the group consisting of:
a basic service set identifier (BSSID);
a homogeneous extended service set identifier (HESSID); and
a service set identifier (SSID).

19. The wireless device of claim 17, wherein determining that the wireless device is connected to the at least one WLAN access point comprises:
determining that the wireless device is connected to a WLAN access point associated with a WLAN identifier that is not included in the list of the one or more WLAN identifiers.

20. The wireless device of claim 12, wherein, in response to a connection being established between the wireless device and the at least one WLAN access point within the mobility set before the expiration of the timer, the wireless device is configured to:
determine that the wireless device is configured to send a report indicating the establishment of a successful connection; and
send, to the network node, the report indicating the establishment of a successful connection with the at least one WLAN access point within the mobility set.

21. The wireless device of claim 12, wherein the connection is not established between the wireless device and the at least one WLAN access point before the expiration of the timer, and the wireless device is configured to:
discard the mobility set.

22. The wireless device of claim 12, wherein the report indicates the connection failure after wireless device is not able to establish a connection between the wireless device and any WLAN within the mobility set.

23. A method by a network node for configuring a wireless device to report connection status, the method comprising:
transmitting, to a wireless device, a message related to a mobility set associated with a wireless device, the message prompting the wireless device to start a timer and attempt to establish a connection with at least one WLAN access point within the mobility set prior to the expiration of the timer;
upon the wireless device establishing a connection with at least one WLAN access point within the mobility set, receiving, from the wireless device, a report indicating a connection failure with at least one other WLAN access point within the mobility set and the successful connection with the at least one WLAN access point; and
upon the wireless device failing to establish a connection with at least one WLAN access point within the mobility set, receiving, from the wireless device, a report indicating a connection failure after the wireless device is not able to establish the connection between the wireless device and the at least one WLAN access point within the mobility set before expiration of the timer.

24. The method of claim 23, wherein:
the message comprises an update identifying at least a first WLAN for removal from the mobility set; and
the wireless device is connected to the first WLAN prior to the removal of the first WLAN from the mobility set.

25. The method of claim 24, wherein the report indicates that the wireless device was not able to establish a connection between the wireless device and any WLAN remaining within the mobility set after the update.

26. The method of claim 23, wherein the message identifies at least one additional WLAN to be added to the mobility set.

27. The method of claim 23, wherein the mobility set comprises a list of one or more WLAN identifiers, each of the one or more WLAN identifiers associated with an WLAN access point to which the wireless device is configured to connect, wherein each of the one or more WLAN identifiers is selected from the group consisting of:
a basic service set identifier (BSSID);
a homogeneous extended service set identifier (HESSID); and
a service set identifier (SSID).

28. A network node for configuring a wireless device to report connection status, the network node comprising an interface, a processor, and storage, the network node configured to:
transmit, to a wireless device, a message related to a mobility set associated with a wireless device, the message prompting the wireless device to start a timer and attempt to establish a connection with at least one WLAN access point within the mobility set prior to the expiration of the timer;
upon the wireless device establishing a connection with at least one WLAN access point within the mobility set, receive, from the wireless device, a report indicating a connection failure with at least one other WLAN access point within the mobility set and the successful connection with the at least one WLAN access point; and
upon the wireless device failing to establish a connection with at least one WLAN access point within the mobility set, receive, from the wireless device, a report indicating a connection failure after the wireless device is not able to establish the connection between the wireless device and the at least one WLAN within the mobility set before expiration of the timer.

29. The network node of claim 28, wherein:
the message comprises an update identifying at least a first WLAN for removal from the mobility set; and
the wireless device is connected to the first WLAN prior to the removal of the first WLAN from the mobility set.

30. The network node of claim 29, wherein the report indicates that the wireless device was not able to establish a connection between the wireless device and any WLAN remaining within the mobility set after the update.

31. The network node of claim 28, wherein the message identifies at least one additional WLAN to be added to the mobility set.

32. The network node of claim 28, wherein the mobility set comprises a list of one or more WLAN identifiers, each of the one or more WLAN identifiers associated with an WLAN access point to which the wireless device is configured to connect, wherein each of the one or more WLAN identifiers is selected from the group consisting of:
- a basic service set identifier (BSSID);
- a homogeneous extended service set identifier (HESSID); and
- a service set identifier (SSID).

* * * * *